United States Patent [19]

Oonaka et al.

[11] Patent Number: 4,527,519
[45] Date of Patent: Jul. 9, 1985

[54] METHOD AND SYSTEM FOR CONTROLLING INTAKE FLOW BETWEEN DIRECT AND HELICAL INTAKE PASSAGES OF INTAKE PORT OF INTERNAL COMBUSTION ENGINE

[75] Inventors: Hidemi Oonaka; Nobuki Uchitani, both of Toyota, Japan

[73] Assignee: Toyota Jidosha Kabushiki Kaisha, Aichi, Japan

[21] Appl. No.: 504,323

[22] Filed: Jun. 14, 1983

[30] Foreign Application Priority Data

Jun. 17, 1982 [JP] Japan ................... 57-105017
Jun. 17, 1982 [JP] Japan ................... 57-105018
Jun. 17, 1982 [JP] Japan ................... 57-105019

[51] Int. Cl.$^3$ ........................................ F02F 1/42
[52] U.S. Cl. ........................ 123/188 M; 123/308
[58] Field of Search ............... 123/188 M, 52 M, 306, 123/308, 432

[56] References Cited

U.S. PATENT DOCUMENTS

| | | | |
|---|---|---|---|
| 3,850,479 | 11/1974 | Boyhont et al. ................. | 302/29 |
| 3,884,209 | 5/1975 | List et al. ..................... | 123/188 M |
| 4,159,011 | 6/1979 | Sperry ......................... | 123/188 M |
| 4,174,686 | 11/1979 | Shimizu et al. ................. | 123/308 |
| 4,201,165 | 5/1980 | Tanaka et al. .................. | 123/568 |
| 4,246,874 | 1/1981 | Nakagawa et al. ................ | 123/308 |
| 4,253,432 | 3/1981 | Nohira et al. .................. | 123/52 M |
| 4,256,062 | 3/1981 | Schafer ........................ | 123/52 M |
| 4,257,384 | 3/1981 | Matsumoto ...................... | 123/575 |
| 4,286,554 | 9/1981 | Okamoto ........................ | 123/188 M |
| 4,312,309 | 1/1982 | Nakanishi et al. ............... | 123/188 M |
| 4,411,226 | 10/1983 | Okumura et al. ................. | 123/188 M |
| 4,438,741 | 3/1984 | Okumura et al. ................. | 123/188 M |

FOREIGN PATENT DOCUMENTS

| | | |
|---|---|---|
| 2059008 | 6/1972 | Fed. Rep. of Germany . |
| 143289 | 8/1980 | German Democratic Rep. ........................... 123/188 M |
| 54-58129 | 5/1979 | Japan . |
| 35177 | 3/1980 | Japan ................. 123/188 M |
| 56-54922 | 5/1981 | Japan . |
| 57-68519 | 4/1982 | Japan . |
| 183521 | 11/1982 | Japan ................. 123/306 |
| 28525 | 2/1983 | Japan ................. 123/306 |

Primary Examiner—Ira S. Lazarus
Attorney, Agent, or Firm—Parkhurst & Oliff

[57] ABSTRACT

A method for controlling intake flow of an internal combustion engine having an intake port including a helical passage and a straight passage both extending towards a common port end opening which opens to the combustion chamber of the engine, in such a manner that a minimum proportion of intake flow is directed through the straight passage during idling operation of the engine regardless of the temperature condition of the engine, a maximum proportion of intake flow is directed through the straight passage during loaded operation at any non idling load of the engine when the engine is not warmed up, and a proportion of intake flow increasing according to the level of engine load is directed through the straight passage during loaded operation of the engine when the engine has been warmed up. This method is performed by an intake passage switchover control valve system operated conveniently by utilizing intake vacuum under a proper switchover thereof which itself incorporates the engine load performance.

24 Claims, 13 Drawing Figures

METHOD AND SYSTEM FOR CONTROLLING INTAKE FLOW BETWEEN DIRECT AND HELICAL INTAKE PASSAGES OF INTAKE PORT OF INTERNAL COMBUSTION ENGINE

BACKGROUND OF THE INVENTION

The present invention relates to a method for controlling intake flow for an internal combustion engine, and to a control system which practices said method; and more specifically relates to an intake control method and system for an internal combustion engine which is provided with an intake port construction including both direct and helical intake passages, whereby the relative amounts of intake flow which pass through said direct intake passage and said helical intake passage can be varied.

There are some types of variable swirl intake port construction for an internal combustion engine, which have been developed by colleagues of the present inventors in the works of the assignee of the present application previously to the development of the present invention, for the inventive concepts of which Japanese Patent Applications Ser. Nos. 56-51149 and 56-120634 were filed previously to the filing of Japanese Patent Application Nos. 56-105017, 56-105018 and 56-105019 relating to the present invention of which priority is being claimed in the present application, and for said inventive concepts of which it is known to the present inventors that U.S. patent application Ser. Nos. 341,911 and 404,145 have been filed claiming the priority of the above identified Japanese patent applications, which incorporate two intake passages formed as leading to the opening past the intake poppet valve into the combustion chamber of the engine, one of said passages leading substantially straight to said opening, and the other leading in a curved or helical path to said opening. The first or the straight one of said intake passages is controlled by an intake control valve mounted at an intermediate position therealong, so that its effective flow resistance is variable; and thus the relative amounts of intake flow which pass through said direct intake passage and said helical intake passage can be varied. In other words, when said intake control valve is closed to the maximum extent (i.e., in general, is fully closed), then a maximum proportion of the intake flow (of air or of air/fuel mixture, according to the particular application) which is sucked in by the combustion chamber through the intake port construction is sucked in through the helical intake passage and a minimum proportion of said intake flow is sucked in through the straight intake passage, so that as a whole a maximum amount of swirling is imparted to the intake gas sucked into the combustion chamber. On the other hand, when said intake control valve is closed to the minimum extent (i.e., in general, is fully opened), then a minimum proportion of the intake flow sucked in by the combustion chamber through the intake port construction is sucked in through the helical intake passage and a maximum proportion of said intake flow is sucked in through the straight intake passage, so that as a whole a minimum amount of swirling is imparted to the intake gas sucked into the combustion chamber. Such a type of variable swirl intake port construction for an internal combustion engine is shown in FIGS. 1 through 7 of the accompanying drawings, and will be more fully explained in the portion of this specification entitled "DESCRIPTION OF THE PREFERRED EMBODIMENTS".

When the intake flow of an internal combustion engine is imparted with a strong swirling, as in the above described case when the aforesaid intake control valve in the straight intake passage is closed as far as possible so that most or all of the intake flow of the engine passes through the helical intake passage, then the apparent flame propagation speed is increased, and it is possible to operate the engine with a very lean mixture, i.e. with a high air/fuel ratio. Further, strong intake swirling helps with stable idling of the engine, so that, other things being equal, the idling speed can be set very low. On the other hand, the intake volumetric efficiency is reduced, especially during high load engine operation. But in the case when no or very little swirling is provided, as in the above described case when the aforesaid intake control valve in the straight intake passage is opened as far as possible so as to combine the flow through said straight intake passage with the flow through the helical intake passage, then the apparent flame propagation speed is lower and the engine cannot be operated on mixture of such a low air/fuel ratio, and the idling speed cannot be set so low and the idling is not so stable, but on the other hand the intake volumetric efficiency is much higher.

Thus, in the above-identified prior applications, in the engine operational region from low to medium load it was intended to provide high swirling for the gases entering the combustion chamber, by closing said intake control valve so as to eliminate flow through said straight intake passage and so as to concentrate flow in said helical intake passage, while in the engine operational region from medium to high load it was intended to provide low swirling for the gases entering the combustion chamber, by opening said intake control valve so as to promote flow through said straight intake passage while reducing the concentration of flow in said helical intake passage and to increase volumetric efficiency. However, such a simplistic control method would not be effective, for the following reason.

Since when as described above the apparent flame propagation speed increases due to increased swirling the combustion speed and efficiency also increase and the thermal efficiency of the engine also increases, at the same time the temperature of the exhaust gases of the internal combustion engine decreases. Thus, if even when the engine is being warmed up and has not attained is proper operating temperature said intake control valve is kept closed so as to eliminate flow through said straight intake passage and so as to concentrate flow in said helical intake passage in order to promote intake swirling, then hot exhaust gases will not be obtained and warming up of the exhaust system of the engine will be delayed. In the case of an internal combustion engine which is provided with a catalytic converter for the purposes of exhaust gas purification, this means that the catalytic converter also will not be warmed up very quickly as the engine is being warmed up, and, since the effectiveness of a catalytic converter for purifying the exhaust gases of an internal combustion engine is critically dependent upon said catalytic converter being brought to the warmed up condition, this has very bad results from the standpoint of production of harmful pollutants in the exhaust gases of the engine.

However, merely to leave said intake control valve in the open state at all times when the engine is not yet warmed up, so as to promote flow through said straight intake passage and so as to reduce the concentration of flow in said helical intake passage, in order to reduce intake swirling so as to warm up the exhaust gases and thus to warm up such a catalytic converter attached to the exhaust system of the internal combustion engine as quickly as possible, would not be an adequate method of control either, because in this case the drivability during idling operation of the engine, and the stability of idling, which are bad enough in any case when the engine is cold, would be further deteriorated to a very low level, and it would be necessary to set the idling speed of the engine at an unacceptably high level, in order to ensure that the engine would idle reliably at all.

SUMMARY OF THE INVENTION

Thus, with the provision of such a variable swirl intake port construction of an internal combustion engine, a requirement has arisen for a method of control for operating such an intake control valve in this variable swirl intake port construction not only in accordance with the load imposed on the engine but also in accordance with the warming up condition of the engine, and for a control system for practicing the method.

Accordingly, it is the primary object of the present invention to provide such a method of control for such an intake control valve in such a variable swirl intake port construction, which allows the engine to be operated with an appropriate flame propagation speed in its combustion chamber during its warming up operation from the view point of exhaust gas purification.

It is a further object of the present invention to provide a method of control for such an intake control valve in such a variable swirl intake port construction, which provides high intake swirl when said high intake swirl is appropriate in order to maintain stable idling operation of the engine regardless whether the engine is cold or in the warmed up condition.

It is a further object of the present invention to provide such a method of control for such an intake control valve in such a variable swirl intake port construction, which does not provide high intake swirl even in low to medium load operational conditions when the engine is cold.

It is a further object of the present invention to provide such a method of control for such an intake control valve in such a variable swirl intake port construction, which gradually decreases the intake swirling of the internal combustion engine from idling towards high load operational conditions when the engine is in the warmed up condition.

It is a yet further object of the present invention to provide such a method of control for such an intake control valve in such a variable swirl intake port construction, which ensures that a catalytic converter fitted to the exhaust system of the engine is brought into effective operation as quickly as possible.

It is a further object of the present invention to provide such a system for practising such a method of control for such an intake control valve in such a variable swirl intake port construction, which efficiently accomplishes the abovementioned objects.

According to the general method aspect of the present invention, these and other objects relating to a method are accomplished by a method for controlling intake flow of an internal combustion engine having a cylinder head which defines a combustion chamber and has an intake port which opens to said combustion chamber through its end opening, said intake port including a helical passage which extends helically around and towards said end opening and a straight passage which extends substantially straight towards said end opening, and an intake passage switchover control valve system which can selectively alter the proportions of intake flow that pass through said straight passage and said helical passage, characterized in that said intake passage switchover control valve system is so controlled that a minimum proportion of intake flow is directed through said straight passage during idling operation of the engine regardless of the temperature condition of the engine, a maximum proportion of intake flow is directed through said straight passage during loaded operation at any non idling load of the engine when the engine is not warmed up, and a proportion of intake flow increasing according to the level of engine load is directed through said straight passage during loaded operation of the engine when the engine has been warmed up.

According to such a method, when the engine in in idling operation, the straight and helical passages of the intake port are so controlled by the intake passage switchover control valve system that a maximum proportion of the intake flow is supplied through the helical passage with strong swirl being given to the intake flow into the combestion chamber at this time, so as to improve combustion of fuel in the combustion chamber, whereby the engine idling operation is stably maintained even with very low setting of the idling revolution, regardless whether the engine has been warmed up or is not warmed up, while on the other hand when the engine is operating in loaded condition with its throttle valve opened beyond the idling position but still in cold not yet warmed up condition, the intake passage switchover control valve system is so controlled that a minimum proportion of the intake flow is supplied through the helical passage, with moderate swirling or substantially no swirling in low load operation being imparted thereto, whereby the combustion speed of fuel in the combustion chamber is kept down to a moderate level and the temperature of the exhaust gases is maintained at a relatively high level, thereby effecting quick warming up of the engine and better purification of engine exhaust gases while said engine is still cold. When the engine is operating in loaded condition in the warmed up condition, the opening of the intake passage switchover control valve system is controlled properly according to the loading condition of the engine so that a proper and appropriate proportion of the intake flow is directed to each of the straight and the helical passages of the intake port, so that swirling of the most desirable intensity is given to the intake flow introduced into the combustion chamber in various loading conditions of the engine.

Further, according to the most general apparatus aspect of the present invention, the abovementioned method for controlling intake flow in an internal combustion engine is performed, for an internal combustion engine having a cylinder head which defines a combustion chamber and has an intake port which opens to said combustion chamber through its one end opening and which is at its other end opening communicated to an interior space within an intake manifold, said intake port including a helical passage which extends helically around and towards its said one end opening and a straight passage which extends substantially straight towards its said one end opening, and an intake passage switchover control valve system which is controllable so as to selectively alter the proportions of intake flow that pass through said straight passage and said helical passage: a system for controlling intake flow of the engine, comprising: a means for detecting the temperature of the engine, a means for detecting the load condition of the engine, and an actuating system for said intake passage switchover control valve system which, according to the temperature of the engine as detected by said temperature detection means and according to the load on the engine as detected by said engine load detecting means, so actuates said intake passage switchover control valve system as to cause a minimum proportion of intake flow to be directed through said straight passage during idling operation of the engine regardless of the temperature condition of the engine, a maximum proportion of intake flow to be directed through said straight passage during loaded operation at any non idling load of the engine when the engine is not warmed up, and a proportion of intake flow increasing according to the level of engine load to be directed through said straight passage during loaded operation of the engine when the cooling water of the engine has been warmed up.

According to such a device, when the engine in in idling operation, regardless whether the engine has been warmed up or is not warmed up, the flows through the straight and helical passages of the intake port are so controlled by the actuating system for the intake passage switchover control valve system that a maximum proportion of the intake flow is supplied through the helical passage. Thus a strong swirl is imparted to the intake flow into the combestion chamber at this time, so as to improve combustion of fuel in the combustion chamber, whereby the engine idling operation is stably maintained even with very low setting of the idling revolution speed. On the other hand, when the engine is operating in loaded condition with its throttle valve opened beyond the idling position but still in cold not yet warmed up condition, the intake passage switchover control valve system is so controlled by the actuating system therefor that a minimum proportion of the intake flow is supplied through the helical passage, with moderate swirling (or substantially no swirling in low load operation) being imparted thereto, whereby the combustion speed of fuel in the combustion chamber is kept down to a moderate level and the temperature of the exhaust gases is maintained at a relatively high level, thereby effecting quick warming up of the engine, and better purification of engine exhaust gases by proper operation of a catalytic converter appended to the exhaust system, while said engine is still cold. When the engine is operating in loaded condition in the warmed up condition, the opening of the intake passage switchover control valve system is controlled by the actuation system therefor properly according to the load condition of the engine so that a proper and appropriate proportion of the intake flow is directed to each of the straight and the helical passages of the intake port, so that swirling of the most desirable intensity is given to the intake flow introduced into the combustion chamber in various load conditions of the engine.

BRIEF DESCRIPTION OF THE DRAWINGS

The present invention will now be shown and described with reference to several preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and features are denoted by like reference symbols in the various figures thereof, and:

DESCRIPTION OF THE PREFERRED EMBODIMENTS

Figure 1:
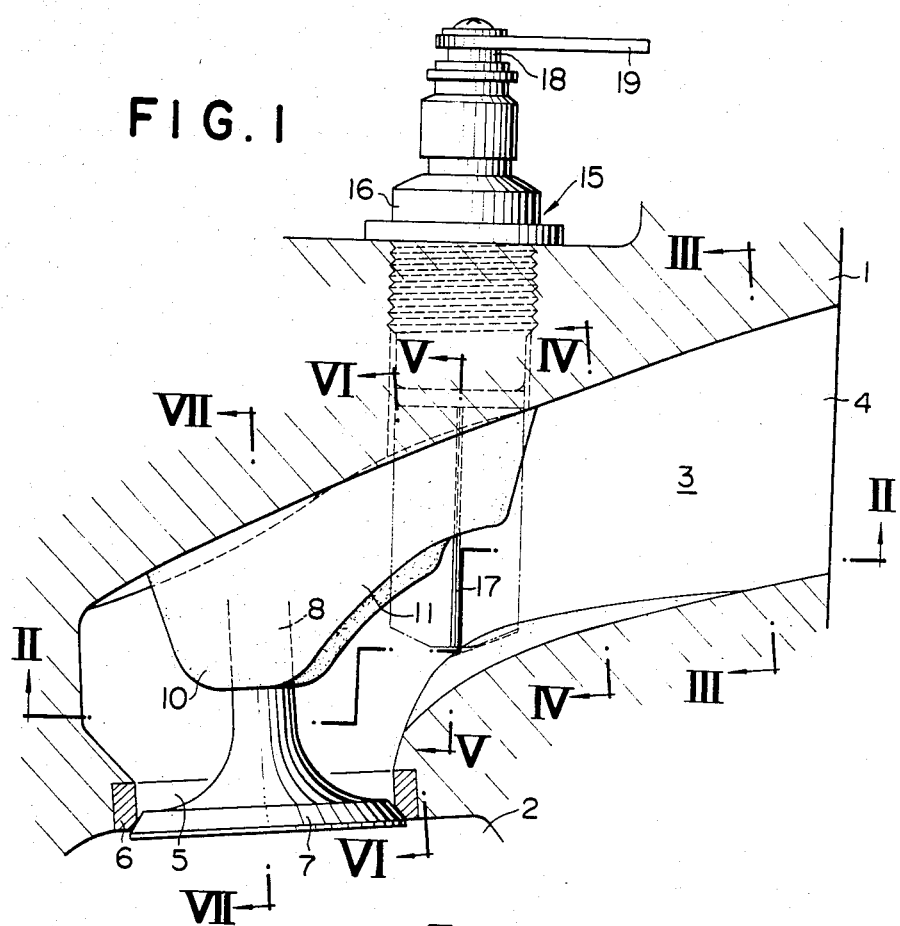
FIG. 1 is a longitudinal sectional view showing an intake port construction of an internal combustion engine, which is of the type incorporating a direct intake passage and a helical intake passage, explained above, and is provided with a switchover valve for switching between these passages.
Figure 7:
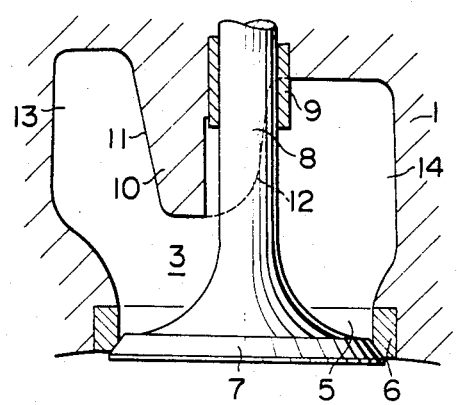
FIG. 7 is yet another sectional view through the intake port construction shown in FIG. 1, taken along a plane and looking in the direction shown by the arrows VII—VII in FIG. 1.
Figure 5:
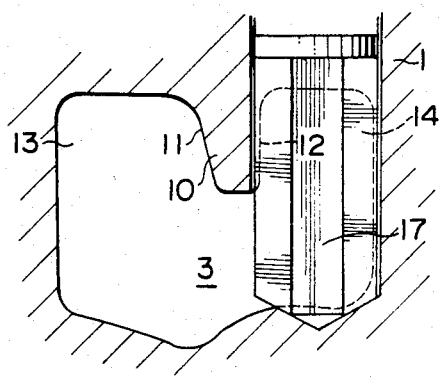
FIG. 5 is another sectional view through the intake port construction shown in FIG. 1, taken along a plane and looking in the direction shown by the arrows V—V in FIG. 1.

The present invention will now be described with reference to several preferred embodiments of the method and the system thereof, and with reference to the appended drawings. First, the intake port construction of the sort described above, to which all of the embodiments will be shown as being applied, incorporating a direct intake passage and a helical intake passage, will be explained in more detail. FIG. 1 is a longitudinal sectional view, showing an intake port construction of an internal combustion engine. In this figure, the reference numeral 1 denotes the cylinder head of the engine, and between this cylinder head 1 and a piston, not shown, a combustion chamber 2 is defined. An intake port 3 is defined generally as a hole through this cylinder head 1, said intake port 3 leading from its upstream end 4 which is an opening in the side wall of the cylinder head 1 to its downstream end 5 which is an opening into the combustion chamber 2. The upstream end 4 of the intake port 3 is connected to an intake manifold, not particularly shown in this figure, and in the part of the cylinder head 1 which defines the circumferential periphery of the downstream end 5 of the intake port 3 there is set a valve seat 6, which is formed as a ring whose cross section is a rectangle with one corner cut away obliquely. The valve stem 8 of an intake poppet valve 7 of a per se well known type is fitted in a valve guide 9 (not shown in this figure, but shown in FIG. 7) which is set into the cylinder head 1; and the head portion of the intake poppet valve 7 cooperates with the intake valve seat 6 in a per se well known way selectively either to interrupt the opening through this intake valve seat 6 and discommunicate the intake port 3 from the combustion chamber 2 or to open said opening through said intake valve seat 6 and communicate the intake port 3 with said combustion chamber 2.

Figure 2:
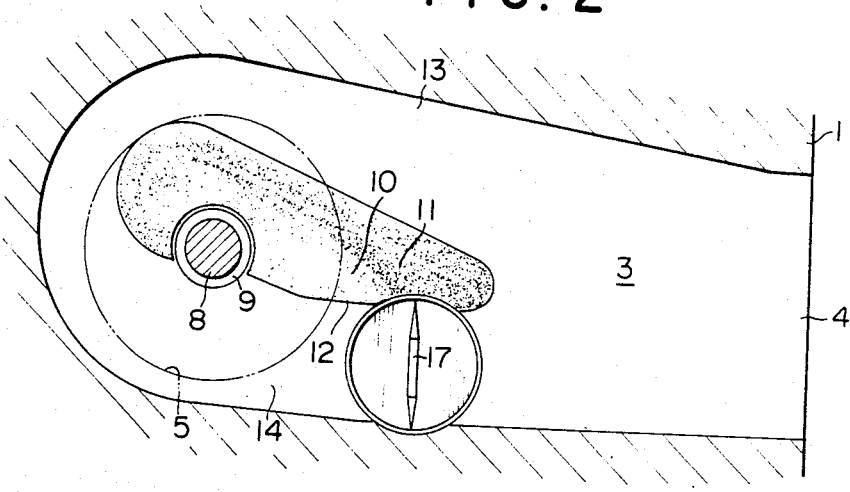
FIG. 2 is a sectional view through the intake port construction shown in FIG. 1, taken along a (stepped) plane and looking in the direction shown by the arrows II—II in FIG. 1, i.e. showing said construction as opened up and as seen from below or from the cylinder block side.
Figure 3:
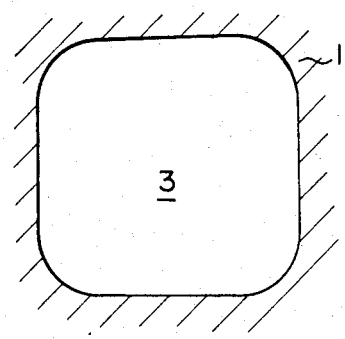
FIG. 3 is a sectional view through the intake port construction shown in FIG. 1, taken along a plane and looking in the direction shown by the arrows III—III in FIG. 1.
Figure 6:
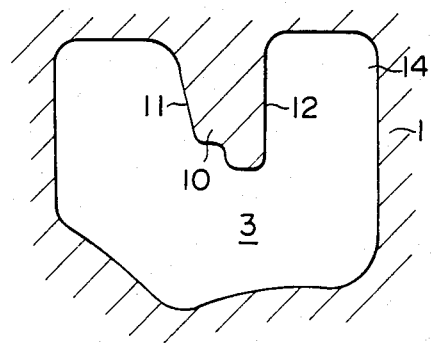
FIG. 6 is yet another sectional view through the intake port construction shown in FIG. 1, taken along a plane and looking in the direction shown by the arrows VI—VI in FIG. 1.
Figure 4:
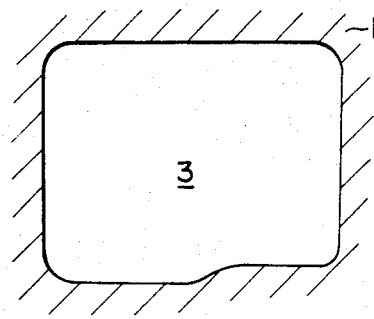
FIG. 4 is another sectional view through the intake port construction shown in FIG. 1, taken along a plane and looking in the direction shown by the arrows IV—IV in FIG. 1.

The shape of the intake port 3, etc., will now be explained. As a whole, said intake port 3 starts off at its upstream end 4 as substantially straight, and becomes more and more bent along its downstream extent, and near is downstream end 5 it is very substantially bent. As can be seen from the side in FIG. 1, and can be best seen in FIG. 2, which is a sectional view through the intake port construction shown in FIG. 1, taken along a (stepped) plane and looking in the direction shown by the arrows II—II in FIG. 1, i.e. as seen from below or from the cylinder block side, the roof of said intake port 3 (its side opposite to the valve seat 6) is formed with a longitudinally extending ridge or vane 10. The height of the vane 10, in other words its projecting or vertical extent as seen in FIG. 1, increases downstream along the intake port 3, the part of said vane 10 opposite the valve seat 6 being the greatest in vertical extent; and the vane 10 has one sloping (from the point of view of FIG. 1) side wall 11 which defines in cooperation with the side wall of the intake port 3 a first intake passage 13, and another substantially vertically extending side wall 12 which defines in cooperation with the other side wall of the intake port 3 a second intake passage 14. Various sections of the intake port 3 and the vane 10 and so on are shown in FIGS. 3 through 7, which are sectional views through the construction taken along the various corresponding planes defined in FIG. 1 as seen in the direction of the corresponding arrows; and it will be understood that the stem 8 of the intake poppet valve 7 emerges from the substantially vertical side wall 12 of the vane 10, at its portion of greatest vertical extent as explained above; and accordingly the side wall 12 extends substantially through the central axis of said poppet valve 8, the valve seat 6, etc. Thus the second intake passage 14 is substantially straight in its extent as leading from an upstream part of the intake port 3 (where the vane 10 substantially starts) to the opening through the valve seat 6 which leads to the combustion chamber 2, so that flow of gas passing down said second intake passage 14 from said upstream part of the intake port 3 is introduced into said combustion chamber 2 without much swirl being imparted thereto. On the other hand, as can be understood from the figures, the first intake passage 13 leads in a helical fashion from said upstream part of the intake port 3 to said opening through the valve seat 6 which leads to the combustion chamber 2, so that flow of gas passing down said first intake passage 13 from said upstream part of the intake port 3 is introduced into said combustion chamber 2 with very substantial swirl (in the counterclockwise direction as seen in FIG. 2) being imparted thereto. In fact, in this particular construction, the two intake passages 13 and 14 are not completely separated from one another; but this need not present any substantial problem.

An intake passage switchover control valve assembly 15 is provided for controlling the flow resistance of the second intake passage 14, i.e. of the straight one of the intake passages. This valve assembly 15 includes a valve element 17 of a flat paddle shape which extends across the straight intake passage 14, which is fixed to a valve shaft 18 which is rotatably supported in a valve casing 16 which is fixedly mounted in the cylinder head 1. A drive lever 19 is fixed to the protruding end of the valve shaft 18, so that when said drive lever 19 is rotated (by a drive system which will be explained hereinafter) the valve shaft 18 and the valve element 17 are likewise rotated and the orientation of the valve element 17 in the second intake passage 14 alters, thus opening or closing said second or straight intake passage 14. As can be seen from FIG. 2, in one of its positions the valve element 17 substantially completely closes the second intake passage 14, and when on the other hand the valve element 17, the valve shaft 18, etc., are rotated through about 90° from this position, then the valve element 17 leaves said second intake passage 14 substantially unobstructed.

Thus, considering the operation when the internal combustion engine is running: when the valve element 17 is in its said position to substantially completely close the second straight intake passage 14, which will henceforward be termed its first position, then most of the intake flow through the intake port 3 passes down the first or helical intake passage 13 (except for some of said flow which passes over the vane 10), and this intake flow is given a very strong swirling action by the curved shape of this first intake passage 13, as it passes through the opening in the valve seat 6 into the combustion chamber 2. Accordingly, the apparent flame speed in the combustion chamber 2 is increased by this swirling of the fuel/air mixture therein. Accordingly the combustion speed is relatively high. But on the other hand the resistance to flow of the intake port 3 as a whole, in this operational mode, is rather high.

But when the valve element 17 is rotated by 90° from its said position, so as to substantially completely open the second straight intake passage 14, which will henceforward be termed its second position, then a large proportion of the intake flow through the intake port 3 passes down said second straight intake passage 14, although a minor part will still pass down the first or helical intake passage 13 (and also some of said flow will still pass over the vane 10), and the intake flow through this second straight intake passage 14 is not given any strong swirling action, as it passes through the opening in the valve seat 6 into the combustion chamber 2, since this intake passage 14 is straight; although the minor portion of the intake flow which is still passing down the first intake passage 13 is still imparted with some swirl by the curved shape of this first intake passage 13. Accordingly, as a whole the intake flow into the combustion chamber 2 does not swirl very much, so that the apparent flame speed in the combustion chamber 2 is lower than in the previous case. Further, the combustion speed is relatively low. But on the other hand the resistance to flow of the intake port 3 as a whole, in this operational mode, is much lower.

Finally, as a matter of course, when the valve element 17 is rotated to an intermediate position between its said first position and its said second position, so as to partly open the second straight intake passage 14, then a medium proportion of the intake flow through the intake port 3 passes down said second straight intake passage 14, and another medium part will still pass down the first or helical intake passage 13 (and also some of said flow will still pass over the vane 10); and, while the portion of the intake flow which is passing through this second straight intake passage 14 is not being given any strong swirling action as it passes through the opening in the valve seat 6 into the combustion chamber 2, since this intake passage 14 is straight, on the other hand the portion of the intake flow which is still passing down the first intake passage 13 is still imparted with some swirl by the curved shape of this first intake passage 13. Accordingly, as a whole the intake flow into the combustion chamber 2 is imparted with a medium amount of swirl, so that the apparent flame speed in the combustion chamber 2 is intermediate between the two extreme cases described above. Further, the combustion speed is also intermediate. Also the resistance to flow of the intake port 3 as a whole, in this intermediate operational mode, is intermediate.

This concludes the explanation of the intake port construction which was described in the previously mentioned Japanese patent applications. Now, in FIG. 8 there is shown a view of an intake port construction for an internal combustion engine, of the type shown in FIGS. 1-7 and described above, and of the cylinder head of the internal combustion engine as a whole, as seen from below or from the cylinder block side, also showing a control system according to the first preferred embodiment of the system of the present invention for controlling the operation of an intake passage switchover control valve of said intake port construction, which practices the first preferred embodiment of the method according to the present invention. Further, in this figure, the reference numeral 40 denotes an intake manifold whose downstream end is connected to the upstream end of the intake port 3, and whose upstream end is connected to the downstream end of a carburetor 41, which has a throttle valve 42; thus in this particular application the intake port construction and control system are being applied to a carburetor type gasoline internal conbustion engine. Further, 45 is an exhaust valve mounted to control outflow of exhaust gases from the combustion chamber 2, 44 is an exhaust port leading from said exhaust valve 45, and 46 is an exhaust manifold the upstream end of which is connected to the downstream end of said exhaust port 44.

In this first embodiment, as in fact in all the six embodiments of the control system according to the present invention which will be described herein, the valve element 17 is driven, via the valve shaft 18 and the drive lever 19, by a drive rod 21, one end of which is coupled to the end of said drive lever 19, and the other end of which is coupled to the diaphragm 22 of a diaphragm actuator 20. This diaphragm actuator 20, in this first preferred emnbodiment as in the other preferred embodiments, is a vacuum actuated device, and comprises a casing within which a diaphragm chamber 23 is defined, said diaphragm 22 constituting one side of this diaphragm chamber 22 and being biased in the direction to increase the volume of the diaphragm chamber 23 by a compression coil spring 24. Vacuum (i.e. gas at a pressure below atmospheric pressure) is selectively admitted to the diaphragm chamber 23 via a vacuum port 25 to which is connected one end of a vacuum conduit 26.

Figure 8:
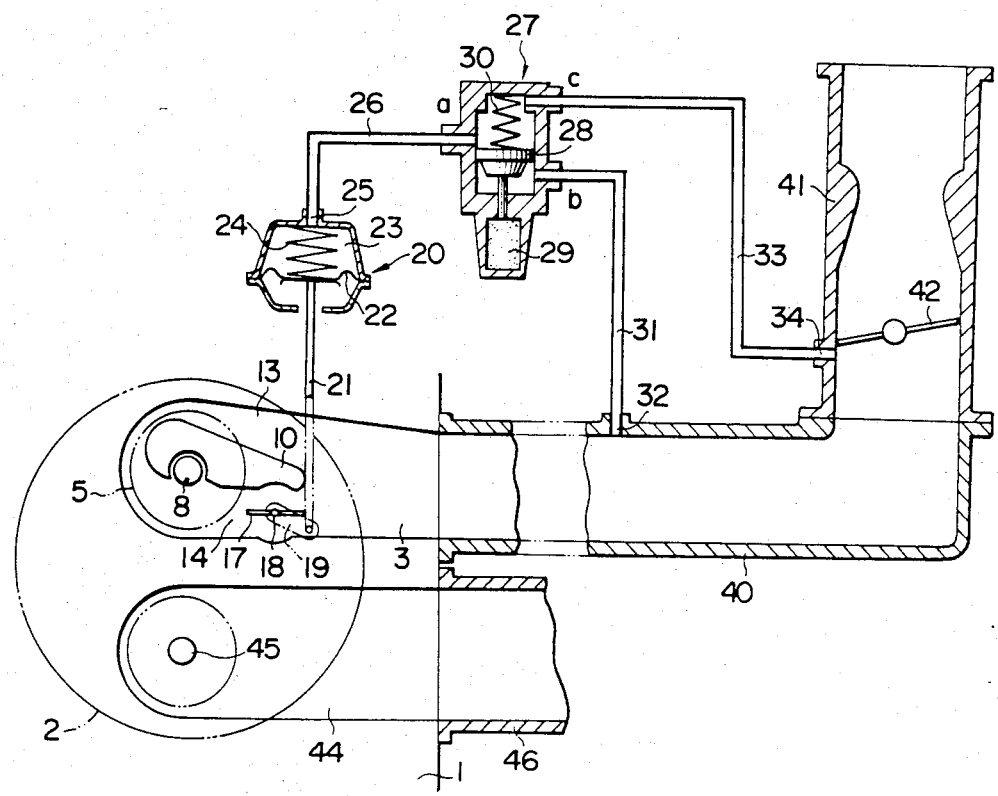
FIG. 8 is a view of an intake port construction for an internal combustion engine, of the type shown in FIGS. 1–7, and of the cylinder head of the internal combustion engine as a whole, as seen from below or from the cylinder block side, also showing a control system according to the first preferred embodiment of the system of the present invention for controlling the operation of an intake passage switchover control valve of said intake port construction, which practices the first preferred embodiment of the method according to the present invention.

Accordingly, when as shown in FIG. 8 no vacuum is supplied via the vacuum conduit 26 and the vacuum port 25 to the diaphragm chamber 23, then under the biasing action of the compression coil spring 24 the diaphragm 22 is shifted downwards in the figure, so as to move the valve rod 21 downwards and so as to move the valve element 17 of the intake passage switchover valve to its above described second position, in which it substantially completely opens the second straight intake passage 14, so that as described above a large proportion of the intake flow through the intake port 3 passes down said second straight intake passage 14, with a minor part still passing down the first or helical intake passage 13, and, since the intake flow through this second straight intake passage 14 is not given any strong swirling action as it passes through the opening in the valve seat 6 into the combustion chamber 2, as a whole the intake flow into the combustion chamber 2 does not swirl very much, so that the apparent flame speed in the combustion chamber 2 is low, and the combustion speed is relatively low, while on the other hand the resistance to flow of the intake port 3 as a whole is much lower. On the other hand, when a strong vacuum is supplied via the vacuum conduit 26 and the vacuum port 25 to the diaphragm chamber 23, then against the biasing action of the compression coil spring 24 which is completely overcome the diaphragm 22 is shifted to the maximum extent upwards in the figure, so as to move the valve rod 21 upwards and so as to move the valve element 17 of the intake passage switchover valve to its above described first position, in which it substantially completely closes the second straight intake passage 14, so that as described above a large proportion of the intake flow through the intake port 3 passes down said first or helical intake passage 13, and, since this intake flow is given a strong swirling action as it passes through the opening in the valve seat 6 into the combustion chamber 2, as a whole the intake flow into the combustion chamber 2 swirls very considerably, so that the apparent flame speed in the combustion chamber 2 is high, and the combustion speed is relatively high, while on the other hand the resistance to flow of the intake port 3 as a whole is much higher. Further, if a vacuum of an intermediate amount is supplied via the vacuum conduit 26 and the vacuum port 25 to the diaphragm chamber 23, then the biasing action of the compression coil spring 24 is partly overcome thereby, and the diaphragm 22 is shifted to an intermediate extent upwards in the figure, the exact position in the vertical direction of said diaphragm 22 depending upon the magnitude of said vacuum value, and according to this the valve rod 21 is moved to a corresponding amount upwards so as to move the valve element 17 of the intake passage switchover valve to an intermediate position between its said first position and its said second position, in which it partly closes the second straight intake passage 14, so that as described above a medium proportion of the intake flow through the intake port 3 passes down said second straight intake passage 14 while also a medium proportion thereof passes down the first or helical intake passage 13, and thus as a whole the intake flow into the combustion chamber 2 swirls by an intermediate amount according to the magnitude of the vacuum value supplied to the diaphragm chamber 23, so that the apparent flame speed in the combustion chamber 2 is likewise medium, and the combustion speed is also likewise medium, while also the resistance to flow of the intake port 3 as a whole is medium.

The other end of the vacuum conduit 26 remote from the diaphragm device 20, in this first preferred embodiment, is connected to a first port denoted by "a" of a temperature sensitive switchover valve 27, which has two other ports "b" and "c". The temperature sensitive switchover valve 27 incorporates a thermowax element 29, which is communicated to the cooling water of the internal combustion engine so as substantially to share its temperature. When the temperature of this cooling water, and of the thermowax 29, is less than a certain predetermined threshold value, then a valve element 28 of the temperature sensitive switchover valve 27 is in the position as shown in the diagram under the biasing action of a compression coil spring 30 which pushes said valve element 28 down against the thermowax 29 which is contracted, and then the port "a" of the temperature sensitive switchover valve 27 is communicated to its port "c", while the port "b" is not communicated to any other port. On the other hand, when the temperature of the cooling water of the internal combustion engine, and of the thermowax 29, is greater than said certain predetermined threshold value, then the valve element 28 of the temperature sensitive switchover valve 27 is biased upwards from the position shown in the diagram against the biasing action of the compression coil spring 30 which is overcome by the thermowax 29 which is expanded, and then the port "a" of the temperature sensitive switchover valve 27 is communicated to its port "b", while the port "c" is not communicated to any other port.

The port "b" of the temperature sensitive switchover valve 27 is communicated to one end of a vacuum conduit 31, the other end of which is communicated to a port 32 set in the side of the intake manifold 40, said port 32 being at a position in the intake system of the internal combustion engine which is always downstream of the throttle valve 42 of the carburetor 41. On the other hand, the port "c" of the temperature sensitive switchover valve 27 is communicated to one end of a vacuum conduit 33, the other end of which is communicated to a port 34 set in the side of the intake passage of the carburetor 40, said port 34 being at a position in the intake system of the internal combustion engine which is downstream of the throttle valve 42 when said throttle valve 42 is fully closed, but comes to be upstream of the throttle valve 42 when said throttle valve 42 is opened a little way from its idling or most closed position.

The control system as described above, according to the first preferred embodiment of the present invention, operates as will now be described.

When the engine is running in the not yet fully warmed up condition, so that the temperature of its cooling water is below said certain predetermined threshold temperature, then the thermowax element of the temperature sensitive switchover valve 27 is in its contracted condition, and therefore as explained above the port "a" of said switchover valve 27 is communicated to its port "c" (as shown in FIG. 8) and in this operational condition the diaphragm chamber 23 of the diaphragm actuator 20 is supplied with vacuum from the port 34 in the carburetor 41, via the vacuum conduits 33 and 26. Thus, the diaphragm chamber 23 is supplied with a high vacuum value when the throttle valve 42 is in the idling position, but as soon as the throttle valve 42 moves off the idling position then the diaphragm chamber 42 is supplied with a very low or substantially zero vacuum value. Therefore, according to the function of the diaphragm actuator 20 as explained above, when the throttle valve 42 is in the idling position, then due to the high vacuum value present at the port 34 at this time the valve element 17 of the intake passage switchover valve is moved against the biasing action of the compression coil spring 24 which is completely overcome to its above described first position, in which it substantially completely closes the second straight intake passage 14, so that as described above a large proportion of the intake flow through the intake port 3 passes down the first or helical intake passage 13. Since this intake flow is given a strong swirling action as it passes through the opening in the valve seat 6 into the combustion chamber 2, as a whole the intake flow into the combustion chamber 2 swirls very considerably, so that the apparent flame speed in the combustion chamber 2 is high, and the combustion speed is relatively high. This ensures acceptable idling for the engine when cold; if no swirl or low swirl were imparted to the intake flow at this time, then as explained above the idling stability and the idling drivability of the engine when cold would be quite unacceptable, and a quite unacceptably high idling speed would be required for the engine during this cold operation. The resistance to intake flow of the intake port 3 as a whole is high at this time, but this presents no substantial problem, since the engine is idling. On the other hand, when the throttle valve 42 is shifted even a little way from its idling position, in this cold engine operation using the first preferred embodiment of the control system of the present invention, then a low vacuum value will come to be present at the port 34 in the carburetor 41, which is now upstream of the throttle valve 42, and this low vacuum value will be transmitted to the diaphragm chamber 23 of the diaphragm actuator 20, and thus the valve element 17 of the intake passage switchover valve will be moved by the biasing action of the compression coil spring 24 to its above described second position, in which it substantially completely opens the second straight intake passage 14, so that as described above a large proportion of the intake flow through the intake port 3 passes down said straight intake passage 14. Since this intake flow is given no substantial swirling action as it passes through the opening in the valve seat 6 into the combustion chamber 2, as a whole the intake flow into the combustion chamber 2 swirls very little, in this operational mode, so that the apparent flame speed in the combustion chamber 2 is low, and the combustion speed is relatively low and the exhaust gases of the engine are relatively hot. This ensures quick warming up of the exhaust system of the engine from the cold condition, and more particularly ensures quick warming up of a catalytic converter mounted to said exhaust system to a temperature at which it can properly catalyse the removal of harmful exhaust gas components, thus ensuring quick deployment of pollution reduction capability. Further, the resistance to intake flow of the intake port 3 as a whole is low at this time, which promotes supply of fuel to the engine and also the quick warming up of the catalytic converter.

On the other hand, when the engine is running in the fully warmed up condition, so that the temperature of its cooling water is above said certain predetermined threshold temperature, then the thermowax element of the temperature sensitive switchover valve 27 is in its expanded condition, and therefore as explained above the port "a" of said switchover valve 27 is communicated to its port "b", and in this operational condition the diaphragm chamber 23 of the diaphragm actuator 20 is supplied with vacuum from the port 32 in the intake manifold 40, via the vacuum conduits 31 and 26. Thus, the diaphragm chamber 23 is supplied with a high vacuum value when the throttle valve 42 is in the idling position, and as the throttle valve 42 is moved from the idling position via a middle load position to the high load or fully open position the diaphragm chamber 42 is supplied with a progressively diminishing vacuum value. Therefore, according to the function of the diaphragm actuator 20 as explained above, when the throttle valve 42 is in the idling position, then as before due to the high vacuum value present at the port 34 at this time the valve element 17 of the intake passage switchover valve is moved against the biasing action of the compression coil spring 24 which is completely overcome to its above described first position, in which it substantially completely closes the second straight intake passage 14, so that as described above a large proportion of the intake flow through the intake port 3 passes down the first or helical intake passage 13. Since this intake flow is given a strong swirling action as it passes through the opening in the valve seat 6 into the combustion chamber 2, as a whole the intake flow into the combustion chamber 2 swirls very considerably, so that again the apparent flame speed in the combustion chamber 2 is high, and again the combustion speed is relatively high. This ensures acceptable idling for the engine when warm, and as explained earlier in this specification allows that a relatively low idling speed would be set for the engine during this warm operation. The resistance to intake flow of the intake port 3 as a whole is high at this time, but this presents no substantial problem, since the engine is idling. On the other hand, as the throttle valve 42 is shifted progressively from its idling position towards a middle load position in this warmed up engine operation using the first preferred embodiment of the control system of the present invention, then a progressively decreasing vacuum value is present at the port 32 in the exhaust manifold 40, and this progressively decreasing vacuum value will be transmitted to the diaphragm chamber 23 of the diaphragm actuator 20, and thus the valve element 17 of the intake passage switchover valve will be progressively moved by the balance between the biasing action of the compression coil spring 24 and this progressively decreasing vacuum value via intermediate positions as explained above towards its above described second position in which it substantially completely opens the second straight intake passage 14, which it reaches when the throttle valve 42 has attained a position corresponding to a certain intermediate load value. This progressive movement of the valve element 17 towards its fully opened position progressively decreases the proportion of the intake flow through the intake port 3 which passes through the helical intake passage 13 and progressively increases the proportion thereof which passes down the straight intake passage 14. Thus the amount of swirling action which is imparted to this intake flow as it passes through the opening in the valve seat 6 into the combustion chamber 2 is gradually and progressively diminished, in this operational mode, as the load on the internal combustion engine increases from low load towards middle load, to become minimum at a certain intermediate load value; so that the resistance to intake flow of the intake system of the engine as a whole is progressively diminished as required, thus ensuring an adequate volumetric efficiency of the engine in its warmed up medium to high load operation.

Figure 9:
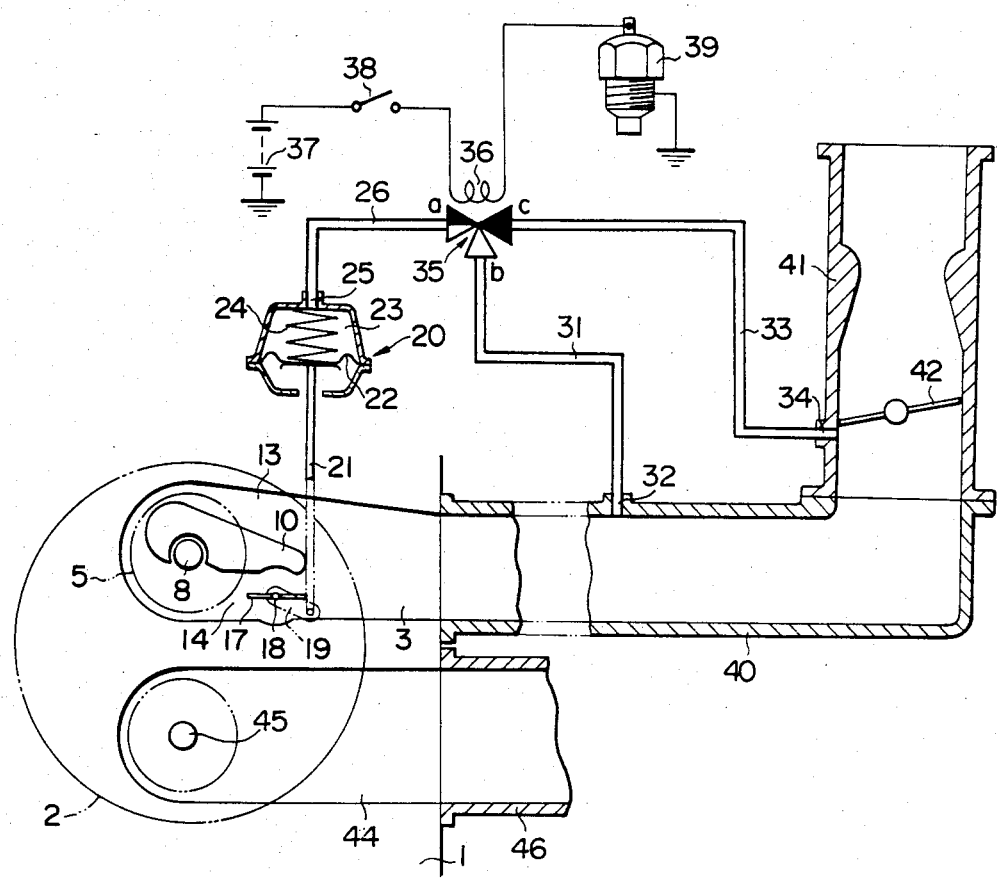
FIG. 9 is a view, similar to FIG. 8, of another intake port construction for an internal combustion engine, again of the type shown in FIGS. 1–7, and of the cylinder head of the internal combustion engine as a whole, also showing a control system according to the second preferred embodiment of the control system of the present invention for controlling the operation of an intake passage switchover control valve of said intake port construction, which practices the second preferred embodiment of the controlled method according to the present invention.

FIG. 9 is a view, similar to FIG. 8, of another intake port construction for an internal combustion engine, again of the type shown in FIGS. 1-7, and of the cylinder head of the internal combustion engine as a whole, also showing a control system according to the second preferred embodiment of the control system of the present invention for controlling the operation of an intake passage switchover control valve of said intake port construction, which practices the second preferred embodiment of the control method according to the present invention. In this figure, parts of the second preferred embodiment shown, which correspond to parts of the first preferred embodiment shown in FIG. 8, and which have the same functions, are designated by the same reference numerals and symbols as in that figure.

In this second preferred embodiment, the layout of the vacuum conduits is exactly the same, as in the case of the first preferred embodiment shown in FIG. 8. The only difference is that the temperature sensitive switchover valve 27, which in that first preferred embodiment directly responded to the temperature of the cooling water of the engine, is replaced by an electromagnetic vacuum switching valve 35 and an electric circuit, the combination of which is functionally identical to said temperature sensitive switchover valve 27 of said first preferred embodiment.

In detail, the end of the vacuum conduit 26 remote from the diaphragm device 20, in this second preferred embodiment, is connected to a first port denoted by "a" of the electromagnetic vacuum switching valve 35, which has two other ports "b" and "c". The electromagnetic vacuum switching valve 35 incorporates a solenoid 36. When the solenoid 36 is supplied with actuating electrical energy, the port "a" is communicated to the port "c", while the port "b" is not communicated to any other port. On the other hand, when the solenoid 36 is not supplied with actuating electrical energy, then the port "a" is communicated to its port "b", while the port "c" is not communicated to any other port. This solenoid 36 is selectively supplied with actuating electrical energy via a circuit comprising, as shown, in series, a battery 37 (which is typically the main battery of the vehicle to which the engine is fitted), an ON/OFF switch for the engine 38, and a thermosensitive electrical switch 39. This thermosensitive switch 39 comprises a switching means which is communicated to the cooling water of the internal combustion engine so as substantially to share its temperature. When the temperature of this cooling water is less than a certain predetermined threshold value, then the switch 39 is closed or continuous, so that the solenoid 36 (when the engine is running and the switch 38 is closed, of course) is energized, and then the port "a" is communicated to the port "c", while the port "b" is not communicated to any other port. On the other hand, when the temperature of the cooling water of the internal combustion engine is greater than said certain predetermined threshold value, then the switch 39 is open or discontinuous, and thus as explained above the port "a" is communicated to the port "b", while the port "c" is not communicated to any other port. Therefore, it will be apparent that this second preferred embodiment shown in FIG. 9 operates substantially in the same manner as the first preferred embodiment shown in FIG. 8.

Figure 10:
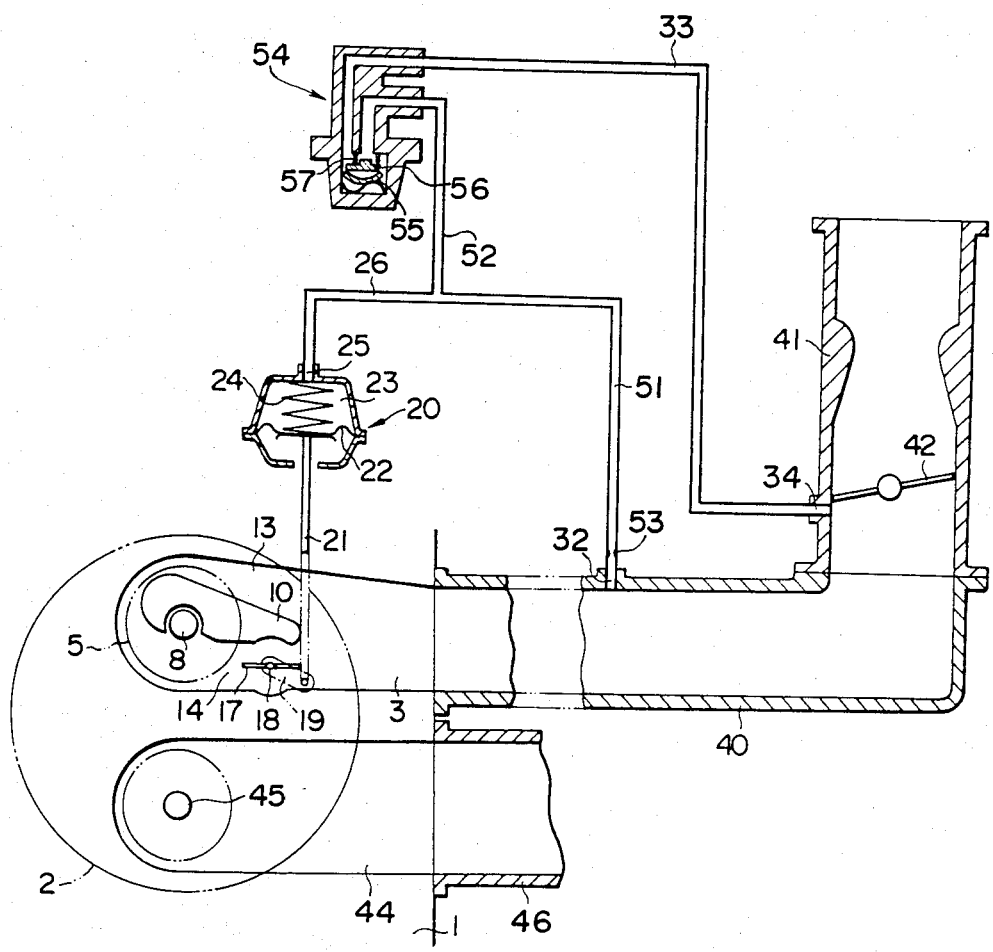
FIG. 10 is a view, similar to FIGS. 8 and 9, of another intake port construction for an internal combustion engine, again of the type shown in FIGS. 1–7, and of the cylinder head of the internal combustion engine as a whole, also showing a control system according to the third preferred embodiment of the control system of the present invention for controlling the operation of an intake passage switchover control valve of said intake port construction, which practices the third preferred embodiment of the control method according to the present invention.

FIG. 10 is a view, similar to FIGS. 8 and 9, of another intake port construction for an internal combustion engine, again of the type shown in FIGS. 1-7, and of the cylinder head of the internal combustion engine as a whole, also showing a control system according to the third preferred embodiment of the control system of the present invention for controlling the operation of an intake passage switchover control valve of said intake port construction, which practices the third preferred embodiment of the control method according to the present invention. In this figure, parts of the third preferred embodiment shown, which correspond to parts of the first and second preferred embodiments shown in FIGS. 8 and 9, and which have the same functions, are designated by the same reference numerals and symbols as in those figures.

In this third preferred embodiment, the layout of the vacuum passages and the switching valve is different from that of the first and second preferred embodiments as shown in FIGS. 8 and 9. The other end of the vacuum conduit 26 remote from the diaphragm device 20, in this third preferred embodiment, is connected via a conduit junction to the ends of two vacuum conduits 51 and 52. The vacuum conduit 51 leads, via a restricted orifice 53, to a port 32 set in the side of the intake manifold 40 to be always downstream of the throttle valve 42 of the carburetor 41. On the other hand, the vacuum conduit 52 leads to a first port of an ON/OFF temperature sensitive switchover valve 54, which has one other port, which is connected to one end of a vacuum conduit 33, the other end of which is communicated to a port 34 set in the side of the intake passage of the carburetor 40 at a position in the intake system of the internal combustion engine which is downstream of the throttle valve 42 when said throttle valve 42 is fully closed, but comes to be upstream of the throttle valve 42 when said throttle valve 42 is opened a little way from its idling or most closed position. The temperature sensitive switchover valve 54 incorporates a bimetallic element 55, which is communicated to the cooling water of the internal combustion engine so as substantially to share its temperature. When the temperature of this cooling water, and of the bimetallic element 55, is less than a certain predetermined threshold value, a valve element 56 of the temperature sensitive switchover valve 54 is in a lower position as viewed in the diagram under the biasing action of a compression coil spring 57 which pushes said valve element 56 down against the bimetallic element 55, and the two ports of the temperature sensitive switchover valve 54 are communicated together. On the other hand, when the temperature of the cooling water of the internal combustion engine, and of the bimetallic element 55, is greater than said certain predetermined threshold value, then the valve element 56 of the temperature sensitive switchover valve 54 is biased upwards in the diagram against the biasing action of the compression coil spring 57, and then the two ports of the temperature sensitive switchover valve 54 are discommunicated from one another.

The control system as described above operates as will now be described.

When the engine is running in the not yet fully warmed up condition, so that the temperature of its cooling water is below said certain predetermined threshold temperature, the bimetallic element 55 of the temperature sensitive switchover valve 54 is in its contracted condition, and therefore the two ports of this valve 54 are communicated together, and in this operational condition the diaphragm chamber 23 of the diaphragm actuator 20 is supplied both with vacuum from the port 33 via the vacuum conduits 33, 52, and 26, and also with vacuum from the port 32 via the vacuum conduits 51 and 26 and the restricted orifice 52. Thus, the diaphragm chamber 23 is supplied with a high vacuum value when the throttle valve 42 is in the idling position, but as soon as the throttle valve 42 moves off the idling position the diaphragm chamber 42 is supplied with a very low or substantially zero vacuum value from the port 34, which completely overcomes the vacuum provided from the port 3, due to the provision of the restricted orifice 53. Therefore, according to the function of the diaphragm actuator 20 as explained in the description of the first preferred embodiment, when the throttle valve 42 is in the idling position, due to the high vacuum value present at the port 34, at this time the valve element 17 of the intake passage switchover value is moved against the biasing action of the compression coil spring 24 to its first position, in which is substantially completely closes the second straight intake passage 14, so that a large proportion of the intake flow through the intake port 3 passes down the first or helical intake passage 13, and this intake flow is given a strong swirling action as it passes through the opening in the valve seat 6 into the combustion chamber 2. On the other hand, when the throttle valve 42 is shifted even a little way from its idling position, in this cold engine operation, a low vacuum value will come to be present at the port 34 in the carburetor 41, which is now upstream of the throttle valve 42, and this low vacuum value will be transmitted to the diaphragm chamber 23 of the diaphragm actuator 20, overcoming the vacuum transmitted via the restricted orifice 53 from the port 32, and thus the valve element 17 of the intake passage switchover valve will be moved by the biasing action of the compression coil spring 24 to its second position, in which it substantially completely opens the second straight intake passage 14, so that a large proportion of the intake flow through the intake port 3 passes down said straight intake passage 14, and this intake flow is given no substantial swirling action as it passes through the opening in the valve seat 6 into the combustion chamber 2.

On the other hand, when the engine is running in the fully warmed up condition, so that the temperature of its cooling water is above said certain predetermined threshold temperature, that the bimetallic element 55 of the temperature sensitive switchover valve 54 is in its expanded condition, and therefore the two ports of this valve 54 are disconnected from one another, and in this operational condition the diaphragm chamber 23 of the diaphragm actuator 20 is only supplied with vacuum from the port 32, via the vacuum conduits 26 and 51 and the restricted orifice 53. Thus, the diaphragm chamber 23 is supplied with a high vacuum value when the throttle valve 42 is in the idling position, and as the throttle valve 42 is moved from the idling position via a middle load position to the high load or fully open position the diaphragm chamber 42 is supplied with a progressively diminishing vacuum value. Therefore, it will be appreciated that substantially the same operation for the control of the intake passage switchover control valve is obtained by this third preferred embodiment as that obtained by the first and second preferred embodiments.

Figure 11:
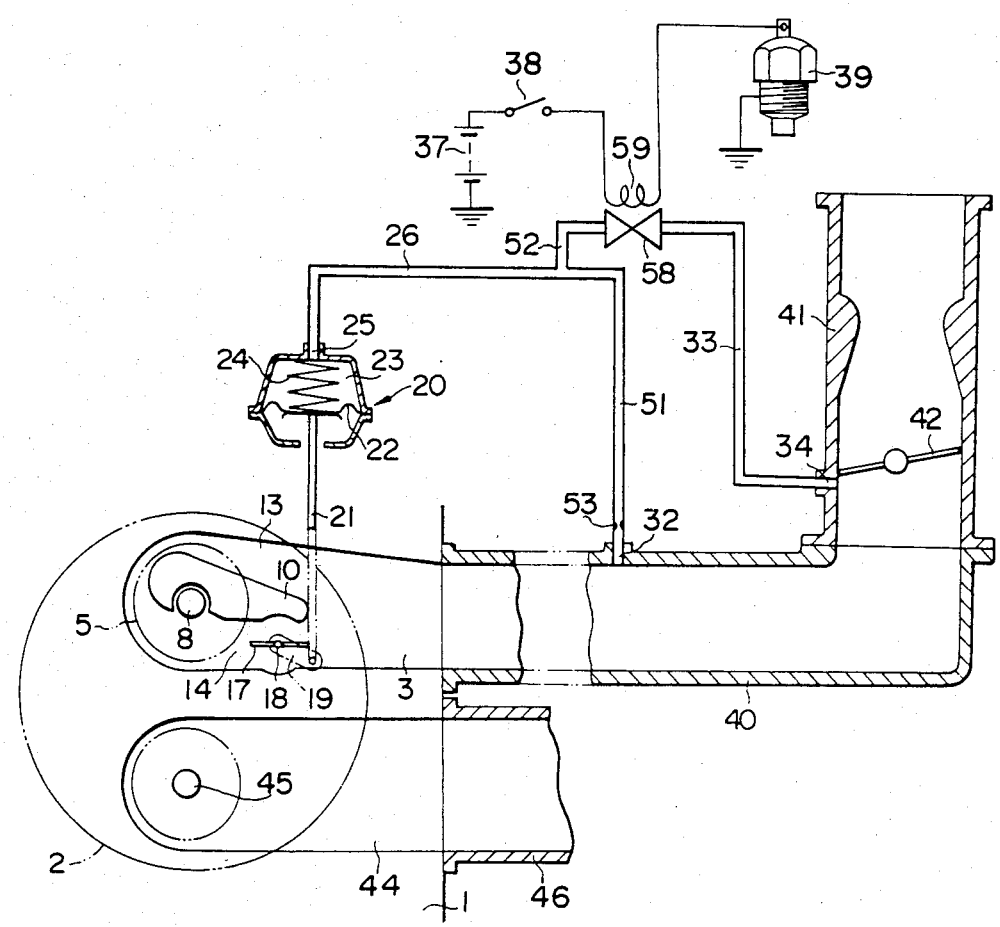
FIG. 11 is a view, similar to FIGS. 8, 9, and 10, of another intake port construction for an internal combustion engine, again of the type shown in FIGS. 1-7, and of the cylinder head of the internal combustion engine as a whole, also showing a control system according to the fourth preferred embodiment of the control system of the present invention for controlling the operation of an intake passage switchover control valve of said intake port construction, which practices the fourth preferred embodiment of the control method according to the present invention.

FIG. 11 is a view, similar to FIGS. 8, 9, and 10, of another intake port construction for an internal combustion engine, again of the type shown in FIGS. 1-7, and of the cylinder head of the internal combustion engine as a whole, also showing a control system according to the fourth preferred embodiment of the control system of the present invention for controlling the operation of an intake passage switchover control valve of said intake port construction, which practices the fourth preferred embodiment of the control method according to the present invention. In this figure, parts of the fourth preferred embodiment shown, which correspond to parts of the first, second, and third preferred embodiments shown in FIG. 8, 9, and 10, and which have the same functions, are designated by the same reference numerals and symbols as in those figures.

In this fourth preferred embodiment, the modification with respect to the third preferred embodiment is exactly the same, as the modification of the second preferred embodiment over the first preferred embodiment; the only difference from the third preferred embodiment is that the temperature sensitive switchover valve 54, which in that third preferred embodiment directly responded to the temperature of the cooling water of the engine, is replaced by an ON/OFF electromagnetic vacuum switching valve 58 and an electric circuit, the combination of which is functionally identical to said temperature sensitive switchover valve 54 of said third preferred embodiment.

In detail, the other end of the vacuum conduit 26 remote from the diaphragm device 20, in this fourth preferred embodiment, is connected via a conduit junction to the ends of two vacuum conduits 51 and 52. The vacuum conduit 51 again leads, via a restricted orifice 53, to a port 32 set in the side of the intake manifold 40 to be always downstream of the throttle valve 42 of the carburetor 41. On the other hand, again, the vacuum conduit 52 leads to a first port of an ON/OFF electromagnetic vacuum switching valve 58 which has one other port, which is connected to one end of a vacuum conduit 33, the other end of which is communicated to the port 34 set in the side of the intake passage of the carburetor 40 at a position which is downstream of the throttle valve 42 when said throttle valve 42 is fully closed, but comes to be upstream of the throttle valve 42 when said throttle valve 42 is opened a little way from its idling or most closed position. The ON/OFF electromagnetic vacuum switching valve 58 incorporates a solenoid 59. When the solenoid 59 is supplied with actuating electrical energy, the two ports of the valve 58 are connected together. On the other hand, when the solenoid 59 is not supplied with actuating electrical energy, the two ports of the valve 58 are discommunicated from one another. This solenoid 59 is selectively supplied with actuating electrical energy via a circuit comprising, as shown, in series, a battery 37, an ON/OFF switch for the engine 38, and a thermosensitive electrical switch 39, such as shown and described with reference to the second preferred embodiment.

When the temperature of this cooling water is less than a certain predetermined threshold value, then the switch 39 is closed or continuous, so that the solenoid 59 (when the engine is running and the switch 38 is closed, of course) is energized, and then the two ports of the ON/OFF electromagnetic vacuum switching valve 58 are connected together. On the other hand, when the temperature of the cooling water of the internal combustion engine is greater than said certain predetermined threshold value, the switch 39 is open or discontinuous, and thus as explained above the two ports of the ON/OFF electromagnetic vacuum switching valve 58 are discommunicated from one another. Therefore, it will be apparent that this fourth preferred embodiment shown in FIG. 11 operates substantially in the same manner as the third preferred embodiment shown in FIG. 10.

Figure 12:
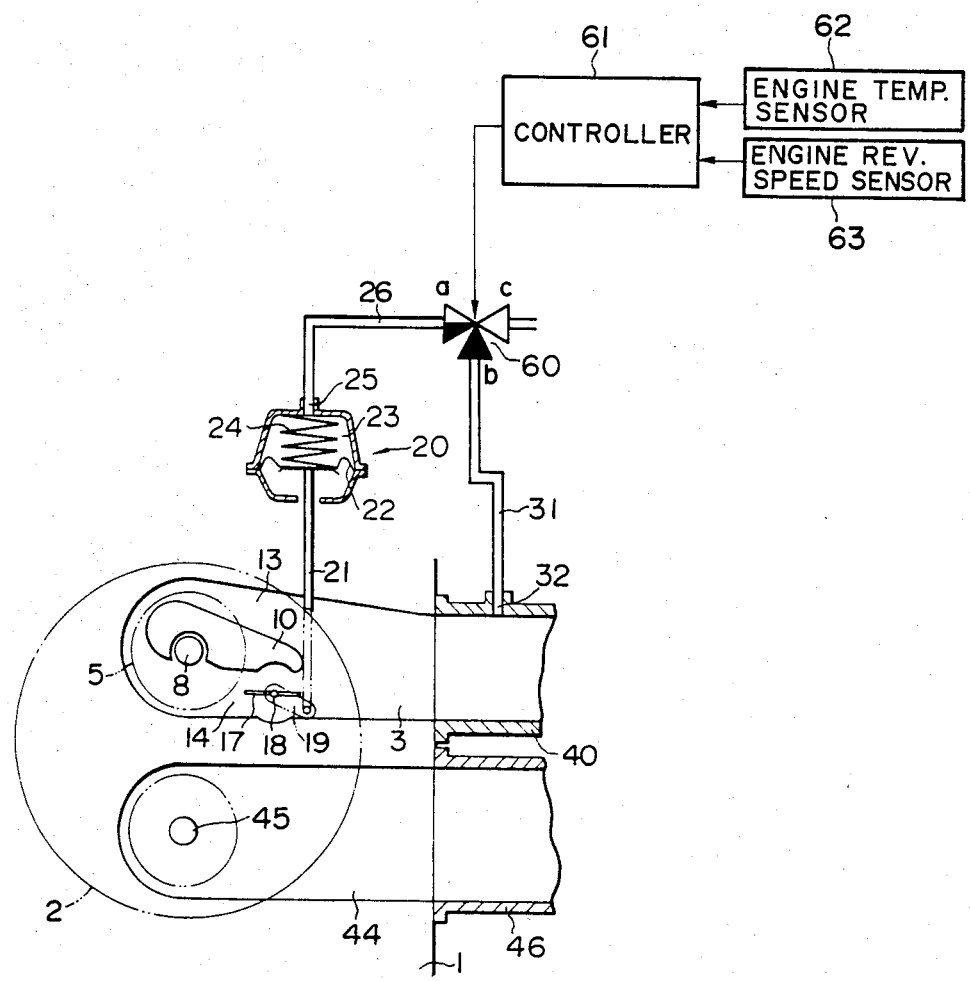
FIG. 12 is a view, similar to FIGS. 8, 9, 10, and 11, of another intake port construction for an internal combustion engine, again of the type shown in FIGS. 1-7, and of the cylinder head of the internal combustion engine as a whole, also showing a control system according to the fifth preferred embodiment of the control system of the present invention for controlling the operation of an intake passage switchover control valve of said intake port construction, which practices the fifth preferred embodiment of the control method according to the present invention.

FIG. 12 is a view, similar to FIGS. 8, 9, 10, and 11, of another intake port construction for an internal combustion engine, again of the type shown in FIGS. 1-7, and of the cylinder head of the internal combustion engine as a whole, also showing a control system according to the fifth preferred embodiment of the control system of the present invention for controlling the operation of an intake passage switchover control valve of said intake port construction, which practices the fifth preferred embodiment of the control method according to the present invention. In this figure, parts of the fifth preferred embodiment shown, which correspond to parts of the first, second, third, and fourth preferred embodiments shown in FIG. 8, 9, 10, and 11, and which have the same functions, are designated by the same reference numerals and symbols as in those figures.

In this fifth preferred embodiment, the layout of the vacuum passages and the switching valve, and the actuation system therefor, are different from those of the previously described four preferred embodiments. The other end of the vacuum conduit 26 remote from the diaphragm device 20, in this fifth preferred embodiment, is connected to a first port denoted by "a" of a two way electromagnetic vacuum switching valve 60, which has two other ports "b" and "c". The electromagnetic vacuum switching valve 60 incorporates a solenoid, not shown. When the solenoid is supplied with actuating electrical energy, the port "a" is communicated to the port "b", while the port "c" is not communicated to any other port. On the other hand, when the solenoid is not supplied with actuating electrical energy, the port "a" is communicated to the port "c", while the port "b" is not communicated to any other port. This solenoid is selectively supplied with actuating electrical energy by a controller 61 (which may in fact be a microcomputer), which is fed input signals from an engine temperature sensor 62 and an engine revolution speed sensor 63. This thermosensitive switch 62 comprises a switching means which is communicated to the cooling water of the internal combustion engine so as substantially to share its temperature, and outputs an ON/OFF electrical signal indicative of whether or not the temperature of the cooling water of the engine is greater than a certain threshold temperature, or not. And the engine revolution speed sensor 62 outputs an electrical signal which is indicative of the current load of the engine.

The port "b" of the electromagnetic vacuum switchover valve 60 is communicated to one end of a vacuum conduit 31, the other end of which is communicated to a port 32 set in the side of the intake manifold 40 to be always downstream of the throttle valve of the carburetor. On the other hand, the port "c" of the valve 60 is communicated to the atmosphere, possibly via an air filter or the like, not shown.

The control system as described above, according to the fifth preferred embodiment of the present invention, operates as will now be described, according to the particular functioning of the controller 61, which will not be described in detail herein because, based upon the details given in this specification, various possible constructions therefor can be easily envisaged by one of ordinary skill in the art.

When the output signal of the engine temperature sensor 62 indicates that the temperature of the engine cooling water is less than the aforementioned certain predetermined threshold value, and when also the output signal of the engine revolution speed sensor 63 indicates that the engine is rotating at a revolution speed greater than a predetermined quite low value (which combination of signals is taken as the definition of the control concept "cold non idling condition"), the controller 61 outputs no energizing electrical signal to the solenoid of the electromagnetic vacuum switchover valve 60, which is therefore deenergized; and at all other times the controller 61 outputs an energizing electrical signal to the electromagnetic vacuum switchover valve 60, which is therefore energized.

Thus, during cold non idling operation of the engine, only, the port "a" of the electromagnetic vacuum switchover valve 60 is communicated to its port "c", while the port "b" is not communicated to any other port; and at all other times the port "a" is communicated to the port "b", whlile the port "c" is not communicated to any other port. Thus, during cold non idling operation of the engine, oniy, the diaphragm chamber 23 of the diaphragm actuator 20 is supplied with a substantially zero vacuum value; and at all other times the diaphragm chamber 23 is supplied with the current intake vacuum value present in the intake manifold 40 (well below any throttle valve in the engine intake system). Therefore, in either cold or warmed up engine operation, when the throttle valve (not shown) of the engine is in the idling position, due to the high vacuum value present at the port 32 at this time the valve element 17 of the intake passage switchover control valve is moved to its first position, in which it substantially completely closes the second straight intake passage 14, so that a large proportion of the intake flow through the intake port 3 passes down the first or helical intake passage 13, and is imparted with a strong swirling motion. On the other hand, when the throttle valve is shifted even a little way from its idling position, so that the engine revolution speed rises to be above the aforesaid predetermined speed, then, in the case of cold engine operation, immediately a substantially zero vacuum value will come to be transmitted to the diaphragm chamber 23 of the diaphragm actuator 20, and thus the valve element 17 of the intake passage switchover valve will be moved to its second position, in which it substantially completely opens the second straight intake passage 14, so that a large proportion of the intake flow through the intake port 3 passes down said straight intake passage 14, and is given no substantial swirling action as it passes through the opening in the valve seat 6 into the combustion chamber 2, so that as a whole the intake flow into the combustion chamber 2 swirls very little.

When the temperature of the cooling water of the internal combustion engine is greater than said certain predetermined threshold value, the port "a" of the electromagnetic vacuum switchover valve 60 is at all times kept communicated to its port "b", while the port "c" is not communicated to any other port. Thus, when the engine is running in the fully warmed up condition, the diaphragm chamber 23 of the diaphragm actuator 20 is supplied with vacuum from the port 32 in the intake manifold 40, via the vacuum conduits 31 and 26. Thus, the diaphragm chamber 23 is supplied with a high vacuum value when the throttle valve of the engine (not shown) is in the idling position, and as the throttle valve is moved from the idling position via a middle load position to the high load or fully open position the diaphragm chamber 23 is supplied with a progressively diminishing vacuum value. Therefore, it will be appreciated that again substantially the same operation for the control of the intake passage switchover control valve is obtained by the fifth preferred embodiment as that obtained by the first through the fourth preferred embodiments.

Figure 13:
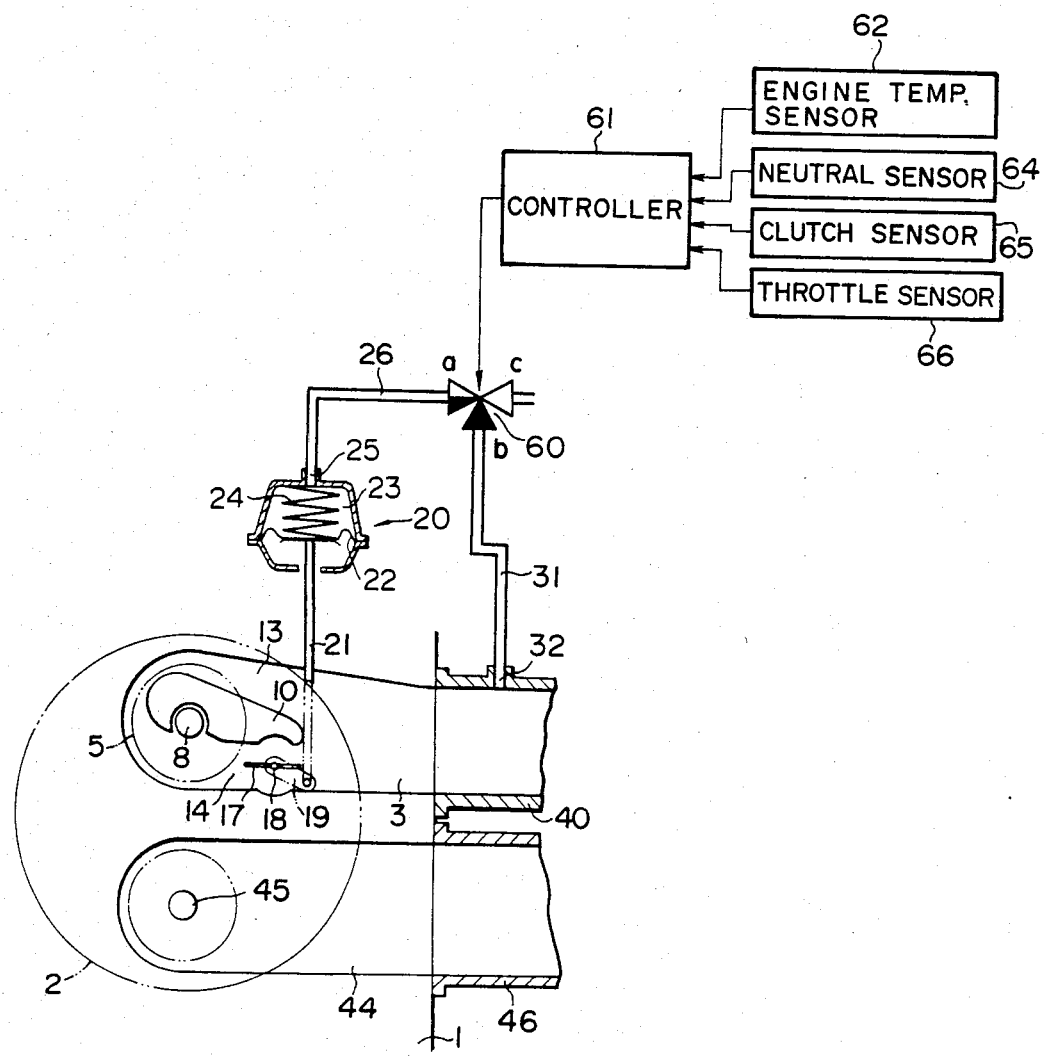
FIG. 13 is a view, similar to FIGS. 8, 9, 10, 11, and 12, of yet another intake port construction for an internal combustion engine, again of the type shown in FIGS. 1-7, and of the cylinder head of the internal combustion engine as a whole, also showing a control system according to the sixth preferred embodiment of the control system of the present invention for controlling the operation of an intake passage switchover control valve of said intake port construction, which practices the sixth preferred embodiment of the control method according to the present invention.

FIG. 13 is a view, similar to FIGS. 8, 9, 10, 11, and 12, of another intake port construction for an internal combustion engine, again of the type shown in FIGS. 1-7, and of the cylinder head of the internal combustion engine as a whole, also showing a control system according to the sixth preferred embodiment of the control system of the present invention for controlling the operation of an intake passage switchover control valve of said intake port construction, which practices the sixth preferred embodiment of the control method according to the present invention. In this figure, parts of the sixth preferred embodiment shown, which correspond to parts of the first, second, third, fourth, and fifth preferred embodiments shown respectively in FIGS. 8, 9, 10, 11, and 12, and which have the same functions, are designated by the same reference numerals and symbols as in those figures.

In this sixth preferred embodiment, the actual construction of the control system is exactly the same, as in the case of the fifth preferred embodiment shown in FIG. 12, except that, instead of the engine revolution speed sensor 63 of that fifth preferred embodiment, three different sensors are provided for supplying electrical output signals to the controller 61: a neutral sensor 64, a clutch sensor 65, and a throttle sensor 66. The neutral sensor 64 outputs a signal which indicates to said controller 61 whether or not the transmission of the vehicle in which this engine is fitted is in neutral; the clutch sensor 65 outputs a signal which indicates to said controller 61 whether or not the clutch of the vehicle is engaged or is disengaged; and the throttle sensor 66 outputs a signal which indicates whether the throttle pedal of the vehicle is being substantially depressed by the foot of the driver, or not.

The control system as described above, according to the sixth preferred embodiment of the present invention, operates as will now be described, according to the particular functioning of the controller 61, which again will not be described in detail herein because, based upon the details given in this specification, various possible constructions therefor can be easily envisaged by one of ordinary skill in the art.

When the output signal of the engine temperature sensor 62 indicates that the temperature of the engine cooling water is less than the aforementioned certain predetermined threshold value, and when also the output signal of the throttle sensor 66 indicates that the throttle pedal is substantially depressed, while also the output signal of the neutral sensor 64 indicates that the transmission is not in neutral and the output signal of the clutch sensor 65 indicates that the clutch is engaged (which combination of signals in this sixth preferred embodiment is taken as the definition of the control concept "cold non idling condition"), then the controller 61 outputs no energizing electrical signal to the electromagnetic vacuum switchover valve 60, which is therefore deenergized; and at all other times the controller 61 outputs an energizing electrical signal to the electromagnetic vacuum switchover valve 60, which is therefore energized. The effects of this function of the controller are exactly the same as in the case of the fifth preferred embodiment, described above, except that the definition of "cold non idling condition" is different; and hence no particular description thereof will be given herein.

Although the present invention has been shown and described with reference to several preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the prehaps purely fortuitous details of the shown embodiments, or of the drawings, but solely by the scope of the appended claims, which follow.

What is claimed is:

1. A method for controlling intake flow of an internal combustion engine having a cylinder head which defines a combustion chamber and has an intake port which opens to said combustion chamber through its end opening, said intake port including a helical passage which extends helically around and towards said end opening and a straight passage which extends substantially straight towards said end opening, and an intake passage switchover control valve system which can selectively alter the proportions of intake flow that pass through said straight passage and said helical passage, characterized in that said intake passage switchover control valve system is so controlled that a minimum proportion of intake flow is directed through said straight passage during idling operation of the engine regardless of the temperature condition of the engine, a maximum proportion of intake flow is directed through said straight passage during loaded operation at any non idling load of the engine when the engine is not warmed up, and a proportion of intake flow increasing according to the level of engine load is directed through said straight passage during loaded operation of the engine when the engine has been warmed up.

2. A method for controlling intake flow of an internal combustion engine according to claim 1, wherein said intake passage switchover control valve system is controlled by selective supply of intake vacuum thereto and provides a greater proportion of intake flow passing through said straight passage and a lesser proportion of intake flow passing through said helical passage the less the amount of depression below atmospheric pressure of said vacuum supply.

3. A method for controlling intake flow of an internal combustion engine according to claim 2, wherein during loaded operation of the engine when the cooling water of the engine has been warmed up said intake passage switchover control valve system is controlled by supply of vacuum thereto from a point in the intake system of the engine which is always downstream of a throttle valve in said intake system.

4. A method for controlling intake flow of an internal combustion engine according to claim 3, wherein during operation of the engine when the cooling water of the engine has not been warmed up said supply of vacuum to said intake passage switchover control valve system from said point in the intake system of the engine which is always downstream of a throttle valve in said intake system is interrupted, and instead said intake passage switchover control valve system is controlled by supply of vacuum thereto from a point in the intake system of the engine which is downstream of a throttle valve in said intake system when said throttle valve is substantially fully closed and is upstream of said throttle valve when said throttle valve is opened more than a slight amount.

5. A method for controlling intake flow of an internal combustion engine according to claim 3, wherein during operation of the engine when the cooling water of the engine has not been warmed up said supply of vacuum to said intake passage switchover control valve system from said point in the intake system of the engine which is always downstream of a throttle valve in said intake system is continued but is overwhelmed by a more copious supply of vacuum from a point in the intake system of the engine which is downstream of a throttle valve in said intake system when said throttle valve is substantially fully closed and is upstream of said throttle valve when said throttle valve is opened more than a slight amount.

6. A method for controlling intake flow of an internal combustion engine according to any one of claims 4 or 5, wherein the switching over of said vacuum supplies is done mechanically.

7. A method for controlling intake flow of an internal combustion engine according to any one of claims 4 or 5, wherein the switching over of said vacuum supplies is done electrically.

8. A method for controlling intake flow of an internal combustion engine according to claim 3, wherein during and only during non idling operation of the engine when the cooling water of the engine has not been warmed up said supply of vacuum to said intake passage switchover control valve system from said point in the intake system of the engine which is always downstream of a throttle valve in said intake system is interrupted, and instead said intake passage switchover control valve system is supplied with a substantially zero vacuum as a controlling vacuum.

9. A method for controlling intake flow of an internal combustion engine according to claim 8, wherein said non idling operation of the engine is when the engine rotational speed is greater than a predetermined value.

10. A method for controlling intake flow of an internal combustion engine according to claim 8, wherein said non idling operation of the engine is when the depression of a throttle pedal associated with the engine is substantial and also a gearbox associated with the engine is not in neutral and also a clutch associated with the engine is engaged.

11. For an internal combustion engine having a cylinder head which defines a combustion chamber and has an intake port which opens to said combustion chamber through its one end opening and which is at its other end opening communicated to an interior space within an intake manifold, said intake port including a helical passage which extends helically around and towards its said one end opening and a straight passage which extends substantially straight towards its said one end opening, and an intake passage switchover control valve system which is controllable so as to selectively alter the proportions of intake flow that pass through said straight passage and said helical passage:
a system for controlling intake flow of the engine, comprising:
a means for detecting the temperature of the engine,
a means for detecting the load condition of the engine,
and an actuating system for said intake passage switchover control valve system which, according to the temperature of the engine as detected by said temperature detection means and according to the load on the engine as detected by said engine load detecting means, so actuates said intake passage switchover control valve system as to cause a minimum proportion of intake flow to be directed through said straight passage during idling operation of the engine regardless of the temperature condition of the engine, a maximum proportion of intake flow to be directed through said straight passage during loaded operation at any non idling load of the engine when the engine is not warmed up, and a proportion of intake flow increasing according to the level of engine load to be directed through said straight passage during loaded operation of the engine when the cooling water of the engine has been warmed up.

12. A system for controlling intake flow of an internal combustion engine according to claim 11, said intake passage switchover control valve system being controlled by supply of intake vacuum thereto and providing a greater proportion of intake flow passing through said straight passage and a lesser proportion of intake flow passing through said helical passage the less the amount of depression below atmospheric pressure of said vacuum supply:
wherein said actuating system for said intake passage switchover control valve system is a control valve and conduit system which, according to the temperature condition and the load condition of the engine as respectively detected by said temperature detection means and said engine load detecting means, selectively: when the engine is idling, regardless of the temperature condition of the engine, supplies the current substantially full value of intake vacuum as controlling vacuum to said intake passage switchover control valve system; when the engine is operating in loaded condition but is not warmed up, does not supply any substantial intake vacuum as controlling vacuum to said intake passage switchover control valve system; and, when the engine is operating in loaded and warmed up condition, supplies the current substantially full value of intake vacuum as controlling vacuum to said intake passage switchover control valve system.

13. A system for controlling intake flow of an internal combustion engine according to claim 12, wherein said actuating system for said intake passage switchover control valve system comprises a two way vacuum switching valve with first, second, and third ports, said first port being selectively either communicated to said second port and discommunicated from said third port or communicated to said third port and discommunicated from said second port.

14. A system for controlling intake flow of an internal combustion engine according to claim 12, wherein said actuating system for said intake passage switchover control valve system comprises an ON/OFF vacuum switching valve with a first and a second port, said first port being selectively either communicated to said second port or discommunicated therefrom.

15. A system for controlling intake flow of an internal combustion engine according to claim 13, wherein said vacuum switching valve is a mechanical valve that is mechanically switched according to the temperature of the cooling water of the engine.

16. A system for controlling intake flow of an internal combustion engine according to claim 13, wherein said vacuum switching valve is an electrical valve that is electrically switched over according to the temperature of the cooling water of the engine.

17. A system for controlling intake flow of an internal combustion engine according to claim 14, wherein said ON/OFF vacuum switching valve is a mechanical valve that is mechanically switched according to the temperature of the cooling water of the engine.

18. A system for controlling intake flow of an internal combustion engine according to claim 14, wherein said ON/OFF vacuum switching valve is an electrical valve that is electrically switched over according to the temperature of the cooling water of the engine.

19. A system for controlling intake flow of an internal combustion engine according to any one of claim 15 or claim 16, for an engine in which a throttle valve is fitted upstream of said intake manifold, wherein said first port of said two way vacuum switching valve is connected to said intake passage switchover control valve system to supply controlling vacuum thereto, said second port of said two way vacuum switching valve is connected to a point in the engine intake system which is always downstream of said throttle valve, and said third port of said two way vacuum switching valve is connected to a point in said engine intake system which is downstream of said throttle valve when said throttle valve is substantially fully closed and is upstream of said throttle valve when said throttle valve is opened more than a slight amount; said first port of said two way vacuum switching valve being connected to said second port thereof when the temperature of the engine is greater than a predetermined value, and being connected to said third port thereof when the temperature of the engine is less than said predetermined value.

20. A system for controlling intake flow of an internal combustion engine according to any one of claim 17 or claim 18, for an engine in which a throttle valve is fitted upstream of said intake manifold, wherein said first port of said ON/OFF vacuum switching valve is connected to said intake passage switchover control valve system to supply controlling vacuum thereto and is also connected with a relatively high flow resistance to a point in the engine intake system which is always downstream of said throttle valve, and said second port of said ON/OFF vacuum switching valve is connected with a relatively low flow resistance to a point in said engine intake system which is downstream of said throttle valve when said throttle valve is substantially fully closed and is upstream of said throttle valve when said throttle valve is opened more than a slight amount; said first port of said ON/OFF vacuum switching valve being connected to said second port thereof when the temperature of the cooling water of the engine is lower than a predetermined value, and being disconnected from said second port when the temperature of the cooling water of the engine is greater than said predetermined value.

21. A system for controlling intake flow of an internal combustion engine according to claim 16, wherein said first port of said two way vacuum switching valve is connected to said intake passage switchover control valve system to supply controlling vacuum thereto, said second port of said two way vacuum switching valve is connected to a point in the engine intake system which is always downstream of said throttle valve, and said third port of said two way vacuum switching valve is communicated to the atmosphere; said first port of said two way vacuum switching valve being connected to said second port thereof at all times except when the temperature of the engine is less than a predetermined value and also the engine is not in the idling operational condition.

22. A system for controlling intake flow of an internal combustion engine according to claim 21, further comprising a controller which receives the output of said means for detecting the temperature of the engine and the output of said means for detecting the load condition of the engine, and which controls said two way vacuum switching valve.

23. A system for controlling intake flow of an internal combustion engine according to claim 21, wherein said means for detecting the load condition of the engine comprises an engine revolution speed sensor.

24. A system for controlling intake flow of an internal combustion engine according to claim 22, wherein said means for detecting the load condition of the engine comprises a combination of a neutral sensor, a clutch sensor, and a throttle pedal sensor.

* * * * *